United States Patent [19]

Curtin et al.

[11] Patent Number: 4,634,811
[45] Date of Patent: Jan. 6, 1987

[54] CALL SCREENING SYSTEM

[75] Inventors: William J. Curtin; Stephen Soto, both of Madison, Wis.

[73] Assignee: Amtel Communications, Inc., McFarland, Wis.

[21] Appl. No.: 625,637

[22] Filed: Jun. 28, 1984

[51] Int. Cl.$^4$ .................... H04M 1/27; H04M 1/56; H04M 3/58
[52] U.S. Cl. .................... 379/211; 379/164; 379/213; 379/361; 379/386
[58] Field of Search .......... 179/90 AN, 27 FC, 27 D; 179/27 FH, 18 BE, 18 BD, 18 AD, 18 BA

[56] References Cited

U.S. PATENT DOCUMENTS

| | | | |
|---|---|---|---|
| 3,928,732 | 12/1975 | Simon et al. | 179/27 FC X |
| 4,117,270 | 9/1978 | Lesea | 179/18 BE |
| 4,296,282 | 10/1981 | O'Neil et al. | 179/99 LS |
| 4,436,963 | 3/1984 | Cottrell et al. | 179/18 B |
| 4,527,013 | 7/1985 | Hardy | 179/27 FH |
| 4,529,841 | 7/1985 | Andersson et al. | 179/18 BE |

Primary Examiner—Thomas W. Brown
Attorney, Agent, or Firm—Robert E. LeBlanc; Israel Gopstein

[57] ABSTRACT

A call screening system to be added onto and used with a PBX or Centrex telephone system having an attendant answering console. The call screening system enables incoming calls for various telephone extensions to be directed to another telephone extension in the system for screening such incoming calls. The call screening system includes a DTMF tone generator and a screening system. The DTMF tone generator is coupled to the attendant answering console for generating a first DTMF coded signal for enabling the attendant answering console to call a screening telephone extension within the telephone system and generating a second DTMF coded signal that provides an indication as to the particular telephone extension within the telephone system for the person that the incoming caller is calling. The screening system is coupled between a single tip/ring line from the PBX or Centrex and a tip/ring line to a screening telephone extension of a user screening incoming calls for other telephone extensions. The screening system receives a call from the attendant answering console when the associated screening telephone extension has been called by a generated first DTMF coded signal for such screening telephone extension, receives a generated second DTMF coded signal generated by said DTMF tone generator for indicating which of the telephone extensions being screened the call is for and generates an indication signal indicating which telephone extension the call is for. After receiving such second DTMF coded signal, the screening system couples the screening telephone extension to the tip/ring line from the PBX or Centrex system for establishing a voice path connection.

20 Claims, 7 Drawing Figures

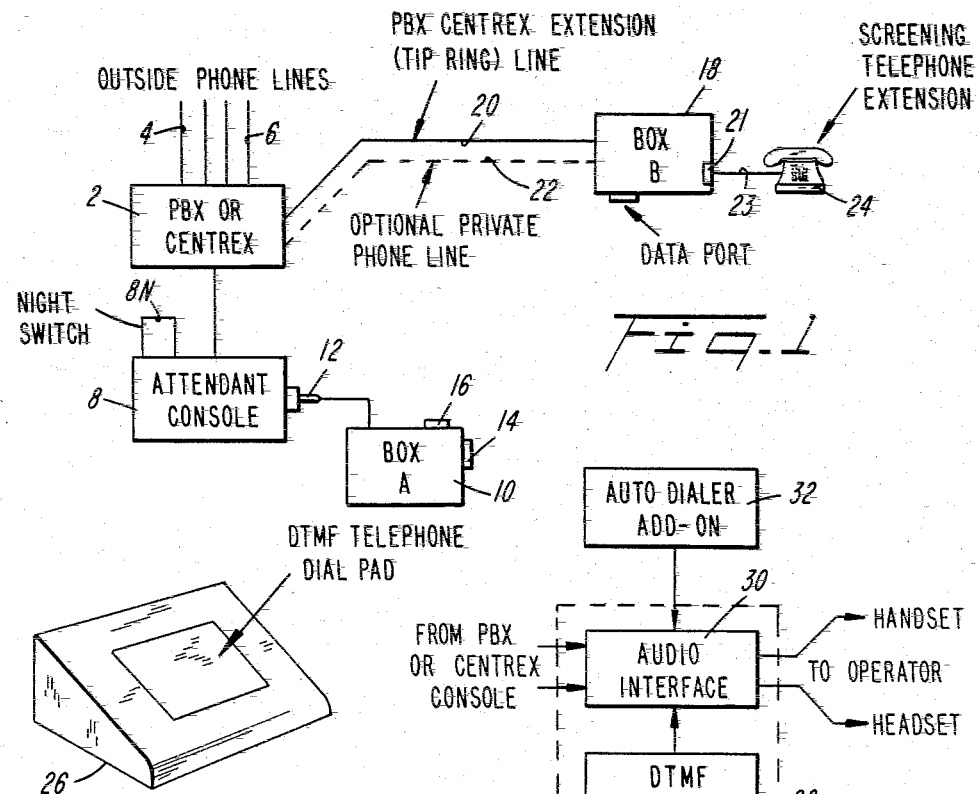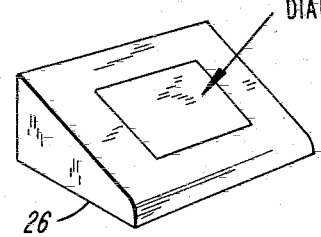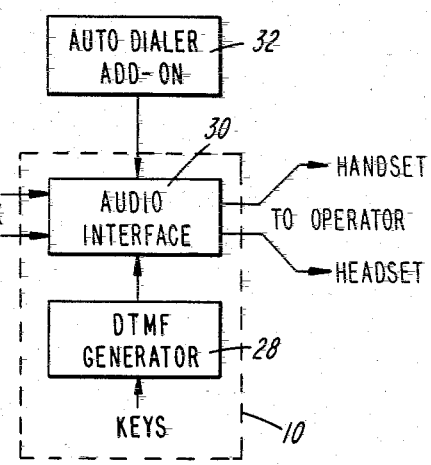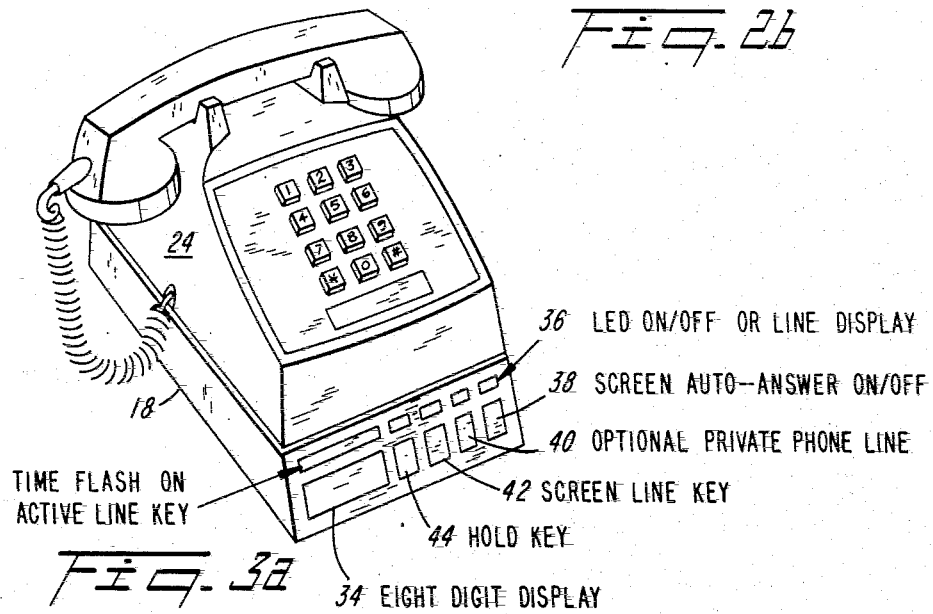

CALL SCREENING SYSTEM

BACKGROUND OF THE INVENTION

The present invention relates to a call screening system which can be added on to and used in conjunction with a telephone system such as a PBX or Centrex telephone system.

Various types of call screening systems have been developed and utilized over the years for enabling calls directed to a particular user within the system to be screened prior to the user receiving the call. There is an increasing demand for personalized answering services and call screening operations so that a user having his calls screened will have the phone answered with his name. In developing improved call screening systems, provisions have been made for enabling the person doing the screening of the incoming calls to answer with the name of the user to which the call is directed; for example, a secretary screening calls can answer the incoming call with the announcement "Mr. Smith's office."

Various types of electronic telephone systems have built in limited call screening abilities. Various problems have been encountered, however, in adding call screening operations onto existing PBX and Centrex telephone systems. In order to add the call screening operation onto the PBX and Centrex telephone systems with provisions for the person doing the screening to answer an incoming call with some type of identification announcement for the particular phone being screened, it has been necessary to utilize two sets of tip/ring telephone lines for each telephone extension within the telephone system being screened. In such systems, a voice path is provided across a first tip/ring line to the screening telephone extension and a data path is provided over a second tip/ring line to such telephone extension. The second tip/ring line, i.e. the data line, provides a path over which an identification signal can be sent to the screening attendant for identifying the particular telephone extension actually being called by the incoming call on the voice tip/ring line. Consequently, with such a system two lines need to be provided for each screening telephone extension.

In an alternative type of call screening system, the answering attendant who initially receives the calls coming into the telephone system after ringing the screening telephone extension will stay on the telephone line and indicate the person that the call is actually for before connecting the incoming call to the screening telephone extension. The attendant at the screening telephone extension then can answer the call directed to such extension with an announcement indicating the particular telephone extension being called, e.g., "Mr. Smith's office." This type of system, however, slows down the productivity of the answering attendant answering the calls coming into the main telephone system since the attendant must remain on the line until the screening telephone extension is actually answered.

While various electronic telephone systems have been provided with the built in ability to eliminate the use of the extra telephone tip/ring line while still providing a call screening operation, such electronic telephones only enable a screening telephone extension to screen telephone calls for four to six telephone extension lines.

SUMMARY OF THE INVENTION

An object of the present invention is to provide an improved call screening system.

Another object of the present invention is to provide an improved call screening system which can be added onto an existing telephone system such as a PBX or Centrex system for enabling efficient call screening services to be provided.

A further object of the present invention is to provide a call screening system which can be used in conjunction with a telephone system for enabling incoming telephone calls to be coupled to a screening telephone extension with an indication to the attendant at such screening telephone extension as to whom the incoming call is directed.

The call screening system of the present invention accomplishes the above-noted objectives. This call screening system can be added onto and used in conjunction with a telephone system such as a PBX or Centrex system, which systems have an attendant answering console. The call screening system enables incoming calls for various telephone extensions to be directed to another telephone extension within the system for screening such incoming calls. The call screening system includes a DTMF tone generator which is coupled to the attendant answering console and a screening system which is coupled to the screening telephone extension. The DTMF tone generator coupled to the attendant answering console generates a first DTMF coded signal for enabling the attendant answering console to call a screening telephone extension within the telephone system and generates a second DTMF coded signal which provides an indication as to the particular telephone extension within the telephone system for the person that the incoming caller is calling. The screening system is coupled between a single tip/ring line from the PBX or Centrex system and a tip/ring line to a screening telephone extension of a user screening incoming calls for other telephone extensions. The screening system receives a call from the attendant answering console when the associated screening telephone extension has been called by a generated first DTMF coded signal for such screening telephone extension. The screening system then receives a generated second DTMF coded signal which indicates which of the telephone extensions being screened the call is for. In response to this second signal the screening system generates an indicating signal indicating which telephone extension the call is for; this indicating signal informs the user of the screening telephone extension who the incoming call is for so that an appropriate announcement can be made when answering such incoming call. After receiving the second DTMF coded signal the screening system couples the screening telephone extension to the tip/ring line from the PBX or Centrex system for establishing a voice path connection.

The call screening system of the present invention can be used in several different environments. The call screening system can be used as a stand alone system that is added onto a PBX or Centrex system. The call screening system alternatively can be used in conjunction with a telephone answering service system (TAS system), which is coupled either to the attendant answering console or to the screening telephone extension.

The following sets forth an explanation of a standard operation of the call screening system of the present invention when such system is used merely as an add-on to a PBX or a Centrex telephone system without the incorporation of a TAS system. A phone call arrives at the PBX or Centrex main system which is automatically forwarded to the attendant answering console. The attendant at such console answers the incoming call and finds out that the caller wants to speak with John Doe. The attendant looks up John Doe's telephone extension and sees that his calls are to be screened by Jill Smith. The attendant dials the screening telephone extension number for Jill Smith, e.g. the number 103. The attendant now will hear a ring tone (for example one or two rings) and is coupled to the screening system for the screening telephone extension; the screening system then sends back to the attendant a unique tone. The attendant now dials in on the DTMF generated coupled to the attendant answering console the telephone extension number for John Doe thereby providing a second DTMF coded signal. The attendant alternatively could activate a speed dial key for John Doe on an add-on auto dialer. The attendant now transfers the call to Jill Smith's screening extension number thereby establishing a voice path connection between the PBX or Centrex system and the screening system associated with the screening telephone extension. The screening system on Jill Smith's desk now rings and displays the indication number for John Doe. The screening system also rings Jill Smith's telephone extension. Jill Smith now lifts her telephone extension and the screening system cuts the callers voice path to Jill Smith's telephone. While Jill Smith's phone is ringing, the telephone extension will return a ringing tone to the caller which ringing tone is generated inside of the screening system. If Jill Smith does not answer her telephone after a predetermined number of rings, then the screening system can either automatically answer the incoming call or not answer such incoming call depending on whether an auto answer system has been activated on the screening telephone extension line.

This will allow Jill Smith to screen a call and answer the call with an answering phrase such as "John Doe's office, may I help you?" After answering the call, Jill Smith now can flash her telephone and talk with John Doe. Depending on whether John Doe wants to talk with the caller, Jill Smith can transfer the call or take a message.

In addition to the screening telephone line, an optional private line can be provided to the screening system so as to allow Jill Smith to pick up the hand set and receive and make normal calls. If Jill Smith is in a conversation on her private line, the screening system has a switch which allows Jill Smith to place the caller on hold, answer the other call and flip back and forth. The screening system also has a switch which allows Jill Smith to place a screened call on hold, answer her private line and flip back and forth.

The screening system includes a mechanism for connecting the voice path to an incoming caller from the telephone system to a screening telephone extension when the screening telephone extension is answered and goes off hook. An auto answering system can be coupled to the screening system for transferring incoming calls directed to a screening telephone extension to another telephone extension within the system. Thus if the screening telephone extension is not answered after a certain number of rings then the call can be transferred to a second screening telephone extension.

The screening system includes a microprocessor for controlling the operation of the system, a ring detector for detecting ring signals received from the telephone system and providing output signals to the microprocessor, a DTMF signal receiver for detecting the second DTMF coded signal and decoding such signal, and a display member for displaying the information contained within the second DTMF coded signal. The screening system is coupled to the voice path of an incoming caller once the first and second DTMF coded signals are received. The screening system also includes a ringback tone generator for providing ringback tone signals to the incoming caller once both DTMF coded signals are received and a voice path connection is established and continuing to provide such ringback tone signals until the screening telephone extension is answered.

A plurality of screening systems can be provided and coupled to the telephone system. Each of these screening systems can be provided with a voice output line and a data output line. A telephone answering system (TAS system) can be coupled to both the voice output lines and the data output lines of at least several of the screening systems for providing telephone answering services to several of the telephone screening lines.

BRIEF DESCRIPTION OF THE DRAWINGS

FIG. 1 shows a schematic box diagram of the call screening system of the present invention coupled to a PBX or Centrex telephone system.

FIGS. 2a and 2b show a perspective view and a schematic box diagram of the DTMF tone generator of the call screening system of the present invention.

FIGS. 3a and 3b show a front perspective view and a rear view of portions of the screening system and screening telephone extension in accordance with the present invention.

DESCRIPTION OF THE PREFERRED EMBODIMENT

Figure 3B:
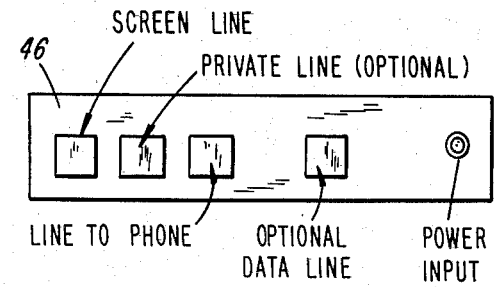

A call screening system in accordance with the present invention is shown in FIG. 1 where the system is coupled to a telephone system 2, which can be either a PBX or Centrex system. The telephone system 2 has a plurality of incoming telephone lines such as telephone lines 4 and 6. These incoming telephone lines are outside lines that extend from the telephone central office (TELCO). The telephone system is provided with an attendant answering console 8, which normally would be monitored by an attendant. It is possible for attendant console 8 to be switched by a night switch 8N to a nighttime operation position wherein all incoming calls will serve to activate an automatic dialer for dialing an appropriate extension depending upon the particular number to which the incoming call is directed.

The call screening system includes two basic boxes, Box A which is a DTMF tone generating system and Box B which is a screening system. Box A 10, shown in FIG. 1, is coupled to attendant console 8 through handset or headset jack 12 on attendant console 8. Box A has a handset or headset jack 14 for the attendant operating attendant console 8 and a phone jack 16 which provides a coupling for an automatic dialer to be plugged into Box A.

Box B 18, shown in FIG. 1, is coupled to the PBX or Centrex telephone system 2 through a PBX/Centrex extension (tip/ring) line 20. In addition, Box B can be provided with an optional private telephone line 22. Box B has an output voice port 21 which is coupled to a screening telephone extension 24 through an interface line 23. Box B also can be provided with an output data port 19.

In FIG. 2a, an exemplary embodiment of Box A is shown by the DTMF tone generator system 26. System 26 would have on its upper face a DTMF telephone dial pad, which would include the standard telephone pushbutton keys as well as possibly other special operational keys, e.g. a hold key. As shown in FIG. 2b, Box A 10 includes the DTMF generator 28 which is activated by the keys such as the keys on the DTMF telephone dial pad 27. The output of the DTMF generator 28 is coupled to an audio interface 30. The audio interface has incoming tip and ring lines from the PBX or Centrex attendant console 8 and also has input/output lines for a handset and headset for use by the operator of the attendant console. In addition, the audio interface is supplied with a jack, jack 16, which provides an input port for auto dialer add-on system 32. The auto dialer add-on system 32 is a speed dialer which enables a telephone number to be dialed by merely hitting a single number on the auto dialer.

In FIG. 3a, there is shown an embodiment of a Box B 18 with a screening telephone extension 24 mounted on top of Box B. On the front of Box B there is an 8-digit display 34, a series of display members 36 for displaying an indication of the particular telephone extension being called by an incoming call, a screen auto answer key 38, an optional private phone line activating key 40, a screen line activating key 42 and a hold key 44. On the back 46 of Box B 18 are a series of input/output terminals as shown in FIG. 3b.

Figure 4:
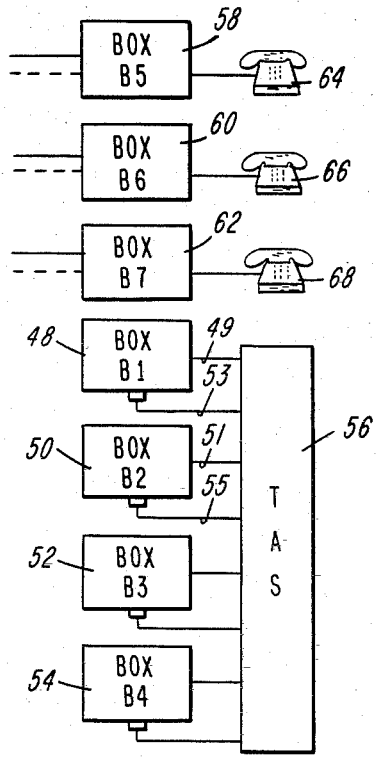
FIG. 4 is a schematic box diagram of a call screening system having a plurality of screening systems with some of these screening systems being coupled to a telephone answering service system in accordance wtih the present invention.

The call screening system of the present invention can be utilized in conjunction with a telephone answering service system (TAS system) such as shown in FIG. 4. As shown in this figure, a plurality of call screening systems, for example, Box B1 48, Box B2 50, Box B3 52 and Box B4 54, are coupled to a TAS system 56. In this arrangement, the voice line such as lines 49 and 51 are connected for providing a voice path connection between each of the screening boxes and the TAS system. In addition, a data line such as lines 53 and 55 can be provided between each of the boxes and the TAS system. The data line would send a signal to the TAS system providing a coded indication as to the particular telephone extension being called by the incoming caller. In this manner, the operator of the TAS system 56 can screen incoming calls for a plurality of the screening telephone extensions within the system. While the TAS system may be coupled to all of the screening systems within the call screening system, it need not be coupled to all of the Box Bs. As shown in FIG. 4, Box B5 58 is coupled to a screening telephone extension 64, Box B6 60 is coupled to a screening telephone extension 66 and Box B7 62 is coupled to a screening telephone extension 68.

Figure 5:
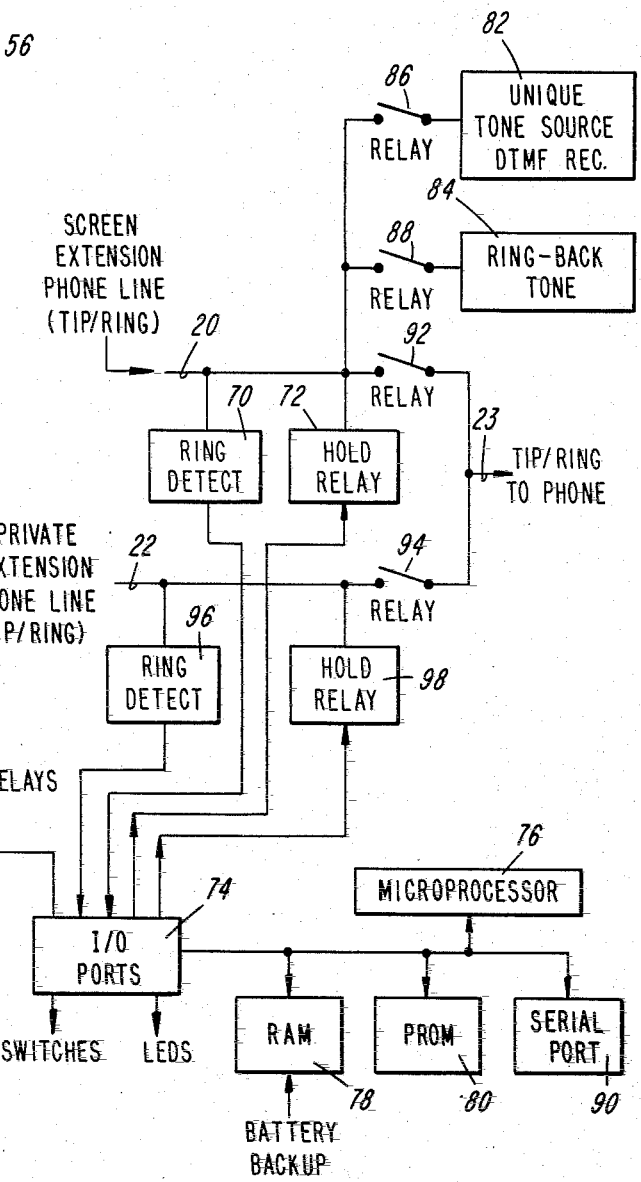
FIG. 5 is a schematic circuit diagram of the screening system of the present invention.

A schematic box diagram of the Box B screening system is shown in FIG. 5. The incoming calls on tip/ring phone line 20 are monitored by a ring detection circuit 70 for detecting when the particular Box B is being called by the attendant console. When a ring signal is received, ring detection circuit 70 provides an input signal into the microprocessor 76 through input/output ports 74. The microprocessor can be a self contained system such as a Z8 from Zilog which would include microprocessor 76, input/output ports 74, RAM 78, PROM 80 and serial output port 90.

When microprocessor 76 has been supplied with input signals indicating that ring detection circuit 70 has detected rings coming into Box B on line 20, the microprocessor first puts out a signal for closing relay 86. When relay 86 is closed, a unique tone by circuit 82 is generated on tip/ring phone line 20 to indicate to the attendant at the attendant console that the second DTMF coded signal, which coded signal indicates which telephone extension the incoming call is for, should be entered. The second DTMF coded signal is then entered by the attendant and supplied to Box B over tip/ring line 20 and is detected by the DTMF receiver of circuit 82. This detected DTMF coded signal then can be decoded through the microprocessor and supplied to a display member for providing an indication as to the particular telephone extension being called. Such indicating display signal would be supplied by the microprocessor through input/output ports to a set of LEDs.

After the second DTMF coded signal has been received, the microprocessor causes relay 88 to be closed. Once relay 88 is closed, a ringback tone is generated by ringback tone generator 84. This ringback tone generated within Box B is supplied on tip/ring phone line 20 to the incoming caller. At this point in time, after the second DTMF coded signal has been received, the attendant has caused the incoming call to be coupled to tip/ring line 20 so that the internally generated ringback tone is heard by the incoming caller.

Now that the second DTMF coded signal has been received and an indication as to the particular telephone extension to which the call is directed has been displayed on Box B such as on display members 36, microprocessor 76 generates signals for causing the screening telephone extension to ring. Once the screening telephone extension, which is coupled to tip/ring line 23, is answered, relay 92 is closed thereby connecting the screening telephone extension to tip/ring line 20 and enabling the screening telephone extension operator to answer the incoming call on tip/ring line 20.

If Box B is provided with the optional private extension tip/ring phone line 22, then a ring detection circuit 96 can be provided for detecting incoming ringing signals on such line. When this private extension phone line is answered, the screening telephone extension operator activates a button for closing relay 94, thereby coupling the screening telephone extension to private extension phone line 22. The operator of the screening telephone extension can place either line 20 or line 22 on hold through operation of hold relays 72 and 98, respectively.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A call screening system to be added onto and used with a PBX or Centrex telephone system having an attendant answering means, said call screening system enabling incoming calls for various telephone extensions to be directed to another telephone extension in the system for screening such incoming calls and said call screening system comprising:
   a DTMF tone generator coupled to the attendant answering means for generating a first DTMF coded signal for enabling the attendant answering means to call a screening telephone extension within the telephone system and generating a second DTMF coded signal that provides an indication as to the particular telephone extension within the telephone system for the person that the incoming caller is calling; and
   screening means coupled between a single tip/ring line from the PBX or Centrex and a tip/ring line to a screening telephone extension of a user screening incoming calls for other telephone extensions, said screening means receiving a call from the attendant answering means when the associated screening telephone extension has been called by a generated first DTMF coded signal for such screening telephone extension, receiving a generated second DTMF coded signal generated by said DTMF tone generator for indicating which of the telephone extensions being screened the call is for and generating an indication signal indicating which telephone extension the call is for, and after receiving such second DTMF coded signal, said screening means coupling the screening telephone extension to the tip/ring line from the PBX or Centrex system for establishing a voice path connection.

2. A call screening system according to claim 1 wherein said screening means includes connection means for connecting the voice path to an incoming caller from the telephone system to a screening telephone extension when the screening telephone extension is answered and goes off hook.

3. A call screening system according to claim 2 further comprising auto answering means coupled to said screening means for transferring incoming calls directed to a screening telephone extension to another telephone extension within the telephone system.

4. A call screening system according to claim 2 wherein said screening means includes microprocessing means for controlling the operation of said screening means, ring detection means for detecting ring signals received from the telephone system and providing output signals to said microprocessing means, DTMF signal receiving means for detecting the second DTMF coded signal and decoding such coded signal, and display means for providing a display of the information contained within the second DTMF coded signal.

5. A call screening system according to claim 4 wherein said screening means is coupled to the voice path of an incoming caller once the first and second DTMF coded signals are received and further includes ring-back tone generating means for providing ring-back tone signals to the incoming caller once both DTMF coded signals are received and a voice path connection is established, and continuing to provide such ring-back tone signals until the screening telephone extension is answered.

6. A call screening system according to claim 1 further comprising automatic dialing means coupled to said DTMF tone generator for automatically generating the first DTMF coded signal and the second DTMF coded signal based upon the particular telephone number being called by an incoming caller.

7. A call screening system according to claim 6 further comprising a nighttime switch means coupled to the telephone system for causing said automatic dialing means to automatically dial the appropriate screening telephone extension based upon the particular number being called by the incoming caller.

8. A call screening system according to claim 6 wherein said screening means includes connection means for connecting the voice path to an incoming caller from the telephone system to a screening telephone extension when the screening telephone extension is answered and goes off hook.

9. A call screening system according to claim 8 further comprising auto answering means coupled to said screening means for transferring incoming calls directed to a screening telephone extension to another telephone extension within the telephone system.

10. A call screening system according to claim 9 wherein said screening means includes microprocessing means for controlling the operation of said screening means, ring detection means for detecting ring signals received from the telephone system and providing output signals to said microprocessing means, DTMF signal receiving means for detecting the second DTMF coded signal and decoding such coded signal, and display means for providing a display of the information contained within the second DTMF coded signal.

11. A call screening system according to claim 10 wherein said screening means is coupled to the voice path of an incoming caller once the first and second DTMF coded signals are received and further includes ring-back tone generating means for providing ring-back tone signals to the incoming caller once both DTMF coded signals are received and a voice path connection is established, and continuing to provide such ring-back tone signals until the screening telephone extension is answered.

12. A call screening system according to claim 1 further comprising a plurality of screening means.

13. A call screening system according to claim 12 wherein each of said screening means has a voice output line and a data output line and further comprising telephone answering means coupled to both the voice output lines and the data output lines of at least several of said screening means.

14. A call screening system according to claim 13 further comprising automatic dialing means coupled to said DTMF tone generator for automatically generating the first DTMF coded signal and the second DTMF coded signal based upon the particular telephone number being called by an incoming caller.

15. A call screening system according to claim 14 further comprising a nighttime switch means coupled to the telephone system for causing said automatic dialing means to automatically dial the appropriate screening telephone extension based upon the particular number being called by the incoming caller.

16. A call screening system coupled to and for use with a telephone system having an answering means, said call screening system enabling incoming calls for various telephone extensions to be directed to another telephone extension in the system for screening such incoming calls, said call screening system comprising:
- a code generator means coupled to the answering means for generating a first coded signal for enabling the answering means to call a screening telephone extension within the telephone system and for generating a second coded signal that provides an indication of the particular telephone extension within the telephone system for the person being called by the incoming call; and
- screening means coupled to a single tip/ring line within the telephone system for the screening telephone extension, for screening incoming calls for other telephone extensions, said screening means receiving a call from the answering means when the associated screening telephone extension has been called by a generated first coded signal for such screening telephone extension, receiving a generated second coded signal generated by said code generator means indicating which of the telephone extensions being screened the call is for, said screening means operable for generating an indication signal indicating which telephone extension the call is for, said screening means coupling the screening telephone extension to the tip/ring line within the telephone system after receiving such second coded signal for establishing a voice path connection.

17. A call screening system according to claim 16 wherein said screening means includes connection means for connecting the voice path to an incoming caller from the telephone system to a screening telephone extension when the screening telephone extension is answered and goes off hook.

18. A call screening system according to claim 17 further comprising auto-answering means coupled to said screening means for transferring incoming calls directed to a screening telephone extension to another telephone extension within the telephone system.

19. A call screening system according to claim 17 wherein said screening means includes microprocessing means for controlling the operation of said screening means, ring detection means for detecting ring signals received from the telephone system and providing output signals to said microprocessing means, signal receiving means for detecting the second coded signal and decoding such coded signal, and display means for providing a display of the information contained within the second coded signal.

20. A call screening system according to claim 19 wherein said screening means is coupled to the voice path of an incoming caller once the first and second coded signals are received and further includes ringback tone generating means for providing ringback tone signals to the incoming caller once both coded signals are received and a voice path connection is established and continuing to provide such ring-back tone signals until the screening telephone extension is answered.

* * * * *